United States Patent [19]

Banks

[11] 4,376,522

[45] Mar. 15, 1983

[54] AIRCRAFT SEAT

[75] Inventor: Harold H. Banks, New Britain, Conn.

[73] Assignee: Kidde, Inc., Belleville, N.J.

[21] Appl. No.: 264,638

[22] Filed: May 18, 1981

[51] Int. Cl.³ .................. A78B 97/00; B60P 7/08; B61D 45/00
[52] U.S. Cl. .................. 248/503.1; 244/118.6; 74/532; 74/526; 292/153; 292/143; 410/105; 410/115
[58] Field of Search .................. 410/74, 75, 90, 91, 410/101, 104, 105, 115, 132, 133, 109, 113, 102, 81; 248/503.1, 429, 501, 502, 503; 244/118.5, 118.6, 122 R, 118.1; 292/152, 153, 143, 173; 74/532, 526

[56] References Cited

U.S. PATENT DOCUMENTS

| 269,963 | 1/1883 | Scanlan | 292/143 |
|---|---|---|---|
| 1,179,247 | 4/1916 | Watson | 292/153 |
| 2,787,918 | 4/1957 | Dow | 74/532 |
| 3,605,637 | 9/1971 | Prete, Jr. | 410/105 |
| 4,026,218 | 5/1977 | Prete, Jr. et al. | 410/105 |
| 4,256,424 | 3/1981 | Knox et al. | 410/104 |
| 4,277,043 | 7/1981 | Weik | 410/105 |

FOREIGN PATENT DOCUMENTS 2267902 11/1975 France .................. 410/101

Primary Examiner—Galen L. Barefoot
Attorney, Agent, or Firm—Lyon & Lyon

[57] ABSTRACT

An aircraft seat adapted to be releasably secured to a track member having a plurality of longitudinally spaced openings interconnected by slots in the top surface thereof and an internal channel communicating with these openings and slots, comprising a rear leg, a track fitting including lugs selectively sized and located for downward insertion into the track channel through selected track openings, a mounting pin for securing the track fitting to the rear leg, a plunger displaceable in a selected direction and selectively sized for mating insertion into a track opening, the plunger including a horizontally extending bore, a lever pivotally mounted on the mounting pin and having a medial bore, a shaft passing through the lever medial bore and the plunger horizontal bore interconnecting same, a spring clip including the shaft, a catch secured to the rear leg for retaining the spring clip at a selected orientation substantially perpendicular to the lever and for preventing upward displacement of the lever, the catch being selectively shaped so that rotation of the spring clip away from the lever a predetermined amount will free the spring clip permitting upward displacement of the lever.

3 Claims, 3 Drawing Figures

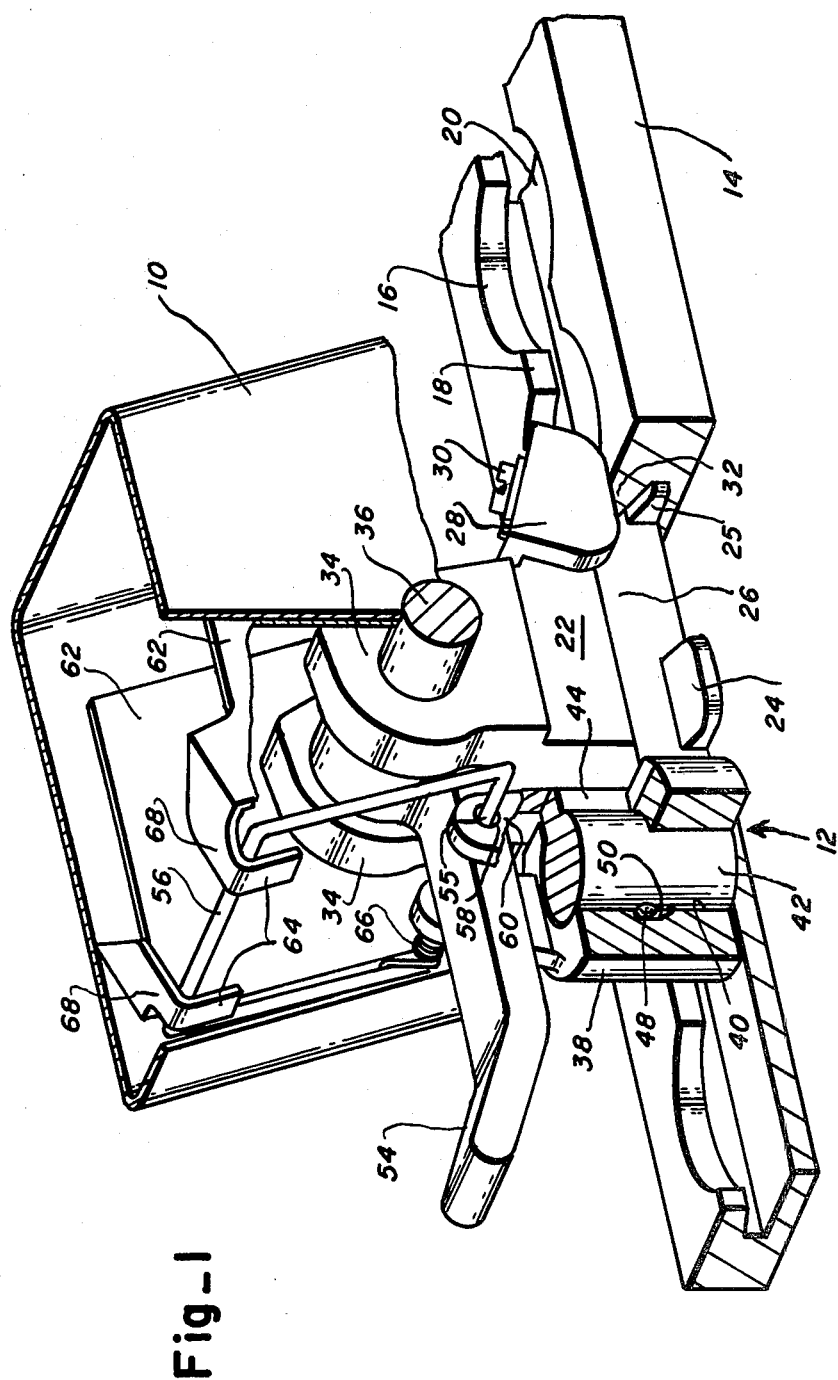
Fig_1

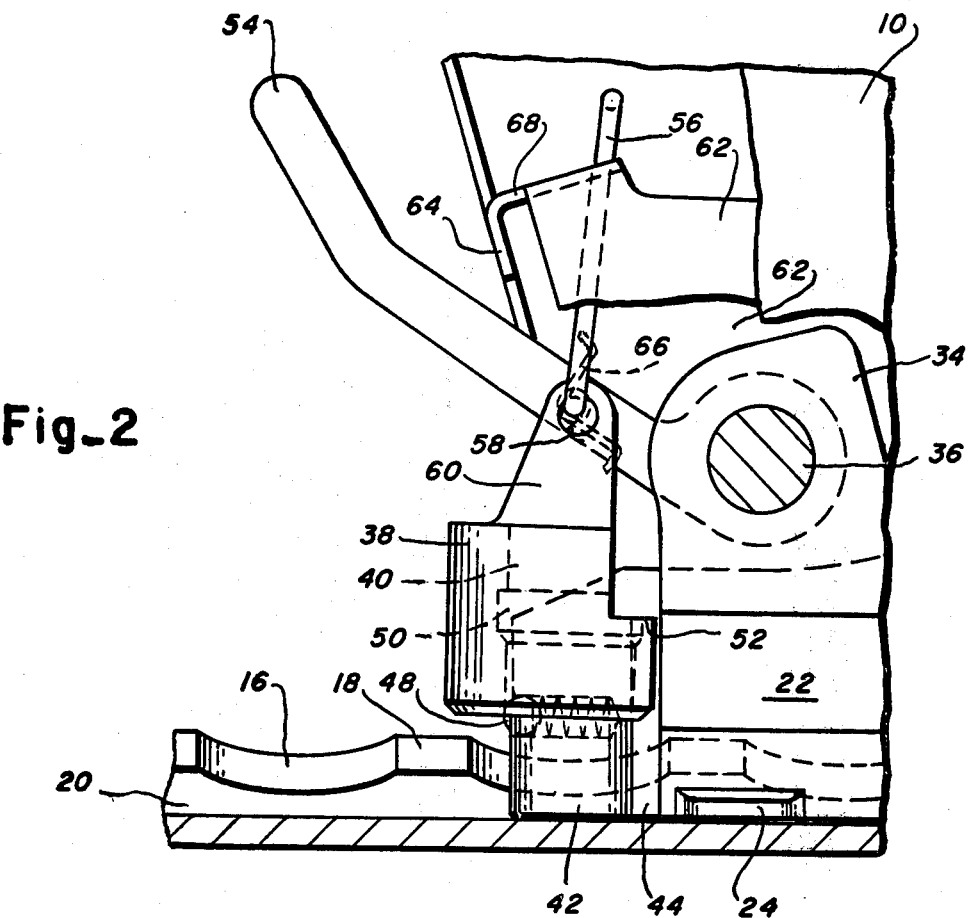
Fig_2
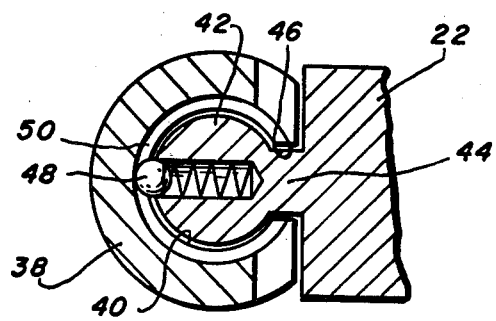
Fig_3

AIRCRAFT SEAT

This invention relates to aircraft seats which are to be releasably secured to conventional floor mounting tracks.

Aircrafts seats are, conventionally, secured to floor tracks by lever actuated mechanisms which can be readily released by manually flipping the lever to its release position.

It is, accordingly, an object of the present invention to provide an aircraft seat which cannot be accidentally released from the floor tracks.

Other objects and advantages of the present invention will become apparent from the following portion of the specification and from the accompanying drawing which illustrates, in accordance with the mandate of the patent statutes, a presently preferred embodiment incorporating the principals of the invention.

Referring to the drawings:

FIG. 1 is a prospective view, partially sectioned, of an aircraft seat made in accordance with the teachings of the present invention releasably secured to a mounting track;

FIG. 2 is a side view of a portion of the aircraft seat illustrated in FIG. 1; and FIG. 3 is a sectional view of the plunger and detent mechanism.

The aircraft seat includes a rear leg 10 which is substantially U-shaped in cross section. A track fitting assembly 12 is mounted within the leg at the bottom thereof for releasably securing the aircraft seat to a conventional floor track 14 having a plurality of longitudinally spaced openings 16 interconnected by slots 18 in the top surface thereof and an internal channel 20 communicating with these openings and slots.

The track fitting assembly 12 includes a track fitting member 22 having lugs 24 and 25 at the bottom of the fitting which are sized and located so as to be insertable into adjacent track openings 16. A track fitting neck portion 26, which is narrower than the slots 18, permits longitudinal displacement of the fitting within the track when the lugs 24 are located in the track channel 20. A clamp member 28 is secured to the fitting 22 by a screw 10 accessible through a suitable window in the leg (not shown) so that longitudinal displacement of the fitting will wedge a narrow slot portion 32 of the track top between the clamp member 28 and the associated track fitting lug 25. Upwardly extending ears 34 having a bore therein permit the fitting to be mounted on a pin 36 extending between opposing sides of the seat leg 10.

The track fitting assembly 12 also includes a cylindrical plunger 38 which includes a central bore 40 which matingly engages with a cylindrical end 42 of the track fitting 22 for vertical slidable displacement relative thereto. This cylindrical member 42, which is also narrower than the track slots 18, is joined to the remaining portion of the track fitting via a parallel rib or key 44 which cooperates with the slot or keyway 46 defined in the plunger.

The plunger 38 is displaceable relative to the track fitting 22 between selected upper and lower positions. A detent 48 is located within the cylindrical control housing 42 and engages with a selected groove 50 defined in the inner diameter of the plunger when the plunger is at the lowered position. As the plunger 38 is raised, the detent 48 is cammed back into the cylindrical control housing. A stop 52, integrally formed in the track fitting at the top of the rib 44, limits the upward displacement of the plunger 38 defining its upper position. When the plunger is raised to its raised position where the plunger clears the track, the bottom surface of the plunger is over center with the detent which thereby holds the plunger in the raised position. The top surface of the control cylinder is beveled permitting limited pivotal displacement of the plunger at the upper position to enhance this holding action.

A lever 54 is pivotally mounted on the pin 36 and has a medial bore through which the bottom leg 55 of a wire clip 56 extends. The leg 55 also passes through oversized apertures 58 in upwardly projecting ears 60 of the plunger thereby interconnecting the plunger and the lever 54.

When the track fitting 22 has been clamped in position by longitudinal displacement along the track, the plunger 38 can be lowered from its raised position to its lowered position located within one of the track openings 16. Longitudinal displacement of the clamped track fitting, and hence, the seat, will, accordingly, be prevented.

Stop plates 62 are welded to the interior of the seat leg 10 on either side of the track fitting assembly 12. Each stop plate 62 has a rotational stop portion 64 which extends to block the counterclockwise rotational movement of the clip 56 at a substantially vertical position when the lever 54 has been pivoted to lower the plunger 38 to its lowered position. A spring 66 biases the clip 56 in the counterclockwise direction against the rotational stop portions 64 of the stop plates 62 maintaining the clip 56 positioned thereagainst. Vertical movement of the spring clip is prevented by horizontal portions 68 of the stop plates thereby holding the plunger 38 in its lowered position.

To release the plunger 38, the spring clip 56 must be pivoted clockwise until it clears the horizontal portions 68 and the stop plate. The lever 54 can then be pivoted to raise the plunger. Once the detent 48 clears the plunger groove 50, the spring clip, if sufficiently strong, will automatically pull the lever, and hence, the plunger to the raised position where the detent will again hold the plunger in position.

While not shown, for purposes of clarity, a horizontal leg strut extending between the front and rear seat legs would also be mounted on the support pin 36 which, in the preferred embodiment, is a lock screw assembly.

What is claimed is:

1. An aircraft seat adapted to be releasably secured to a track member having a plurality of longitudinally spaced openings interconnected by slots in the top surface thereof and an internal channel communicating with these openings and slots, comprising a rear leg, a track fitting including lug means selectively sized and located for downward insertion into the track channel through selected track openings, mounting pin means for securing said track fitting to said rear leg, plunger means displaceable in a selected direction and selectively sized for mating insertion into a track opening, said plunger means including a horizontally extending bore means, a lever pivotally mounted on said mounting pin means and having a medial bore, shaft means passing through said lever medial bore and said plunger horizontal bore means interconnecting same, spring clip means including said shaft means,
catch means secured to said rear leg for retaining said spring clip means at a selected orientation substantially perpendicular to said lever and for preventing upward displacement of said lever, said catch means being selectively shaped so that rotation of said spring clip away from said lever a predetermined amount will free said spring clip means permitting upward displacement of said lever.

2. An aircraft seat according to claim 1 further comprising means for maintaining said plunger means at predetermined raised and lowered positions, said spring clip means comprising means for displacing said plunger means, after release from said lowered position, to said raised position.

3. An aircraft seat according to claim 2 further comprising clamp means secured to said track fitting for clamping the track between said lug means and said clamp means.

* * * * *